United States Patent [19]

Miyazaki et al.

[11] Patent Number: 5,674,637
[45] Date of Patent: Oct. 7, 1997

US005674637A

[54] MAGNETIC RECORDING MEDIUM

[75] Inventors: Shinji Miyazaki; Jiro Yoshinari, both of Nagano; Koji Kobayashi, Miyota-machi, all of Japan

[73] Assignee: TDK Corporation, Tokyo, Japan

[21] Appl. No.: 360,964

[22] Filed: Dec. 21, 1994

[30] Foreign Application Priority Data

Dec. 28, 1993 [JP] Japan ................. 5-334144

[51] Int. Cl.$^6$ ......................................... G11B 5/66
[52] U.S. Cl. .................. 428/694 T; 428/694 TM; 428/900
[58] Field of Search ............ 428/694 T, 694 TM, 428/900

[56] References Cited

U.S. PATENT DOCUMENTS

| | | | |
|---|---|---|---|
| 4,387,136 | 6/1983 | Saito | 428/328 |
| 4,511,635 | 4/1985 | Nagao | 428/694 TS |
| 4,521,481 | 6/1985 | Nagao | 428/336 |
| 4,536,443 | 8/1985 | Nagao | 428/336 |
| 4,596,735 | 6/1986 | Noguchi | 428/215 |
| 4,622,271 | 11/1986 | Arai | 428/615 |
| 4,999,220 | 3/1991 | Honda | 477/132 |
| 5,000,995 | 3/1991 | Kishi | 428/65.7 |
| 5,073,449 | 12/1991 | Niimi | 428/336 |
| 5,225,234 | 7/1993 | Takai | 428/336 |
| 5,525,398 | 6/1996 | Takai | 428/141 |

FOREIGN PATENT DOCUMENTS

| | | |
|---|---|---|
| 54-145505 | 11/1979 | Japan . |
| 61-294635 | 12/1986 | Japan . |
| 1-124115 | 5/1989 | Japan . |
| 1-208720 | 8/1989 | Japan . |
| 2-68712 | 3/1990 | Japan . |
| 2-179917 | 7/1990 | Japan . |
| 4-26914 | 1/1992 | Japan . |

*Primary Examiner*—Leszek Kiliman
*Attorney, Agent, or Firm*—Stephen F. K. Yee

[57] ABSTRACT

A magnetic recording medium having excellent electromagnetic characteristics, still characteristics and cupping resistance, reduced rust generation and increased durability, comprises a non-magnetic substrate and a magnetic layer formed thereon by oblique deposition, the magnetic layer being composed of at least two ferromagnetic metal thin films containing Co and Ni as main components, in which the Co content of the thin film closest to the substrate is less than 70 atomic per cent and the Co content of the film farthest from the substrate is 75 atomic per cent or more.

5 Claims, No Drawings

MAGNETIC RECORDING MEDIUM

BACKGROUND OF THE INVENTION

The present invention relates to a magnetic recording medium having a ferromagnetic thin layer serving as a magnetic layer, and more particularly to a magnetic recording medium excellent in still characteristics, durability and corrosion resistance as well as electromagnetic characteristics.

With recent increases in recording density of magnetic recording media, the thickness of the recording media has been decreased. In magnetic recording media having ferromagnetic thin layers serving as magnetic layers, various magnetic recording media have hitherto been proposed to improve the still characteristics, the durability and the corrosion resistance. For example, Japanese Patent Unexamined Publication No. 54-145505 discloses a magnetic recording medium comprising a polymer molding serving as a substrate; a deposit layer formed on a surface of the substrate, said deposit layer being formed of any one element selected from the group consisting of gold, silver and copper; a deposit layer formed thereon, said deposit layer being formed of a material having a high affinity for oxygen; and a magnetic layer further formed thereon. Japanese Patent Unexamined Publication No. 1-124115 discloses a magnetic recording medium comprising a substrate, an undercoat layer formed thereon and a magnetic layer formed on said undercoat layer by oblique deposition of a ferromagnetic metal material, in which said undercoat layer is formed of a metal or an alloy containing at least one element selected from the group consisting of aluminum, chromium, titanium and copper, and said magnetic layer is formed of the ferromagnetic metal material composed of cobalt or mainly composed thereof and comprises an aggregate of columnar magnetic particles inclined to the normal line of said substrate. Japanese Patent Unexamined Publication No. 2-68712 discloses a thin film type magnetic recording medium comprising a non-magnetic substrate, a non-magnetic undercoat layer formed thereon by paper deposition of a material having a Mobs' hardness of 5 or more, and a recording magnetic layer formed on the undercoat layer through or not through a soft magnetic layer. Japanese Patent Unexamined Publication No. 2-179917 discloses a magnetic recording medium comprising a non-magnetic substrate and a ferromagnetic metal thin film formed thereon, in which an undercoat layer formed of titanium is provided between said non-magnetic substrate and said ferromagnetic metal thin film, and the ferromagnetic metal thin film is laminated with a titanium layer and a diamond-like hard carbon coating layer. Japanese Patent Unexamined Publication No. 4-26914 discloses a magnetic recording medium comprising a non-magnetic substrate and a magnetic layer formed thereon by oblique deposition, said magnetic layer being composed of at least two ferromagnetic metal thin films, said ferromagnetic metal thin films containing Co and Ni as a main component, in which the Co content of the ferromagnetic metal thin film of the uppermost layer is lower than that of the ferromagnetic metal thin film of the lowest layer.

However, in the prior-art magnetic recording media such as the magnetic recording media described in Japanese Patent Unexamined Publication Nos. 54-145505, 1-124115, 2-68712 and 2-179917, the undercoat layers are provided between the non-magnetic substrates and the ferromagnetic thin films to improve the still characteristics, the durability and the corrosion resistance, thereby attempting to enhance adhesion and strength of the magnetic films, and the use of the non-magnetic films under the ferromagnetic thin films lowers the reproduced output at a low density.

Furthermore, in the magnetic recording medium described in Japanese Patent Unexamined Publication No. 4-26914, an attempt is made to improve the still characteristics, the durability and the reproduced output over the range of a low density to a high density by the use of the ferromagnetic thin films in multiple layers. However, there is still room for improvement in output at a high density, still characteristics and durability. Accordingly, a magnetic recording medium excellent in reproduced output, still characteristics, durability and corrosion resistance has been desired.

SUMMARY OF THE INVENTION

In order to solve the above-mentioned problems, the present inventors have conducted intensive investigation. As a result, the present inventors have discovered that the problems can be solved by a magnetic recording medium comprising a magnetic layer composed of at least two ferromagnetic thin film layers formed by oblique deposition, said ferromagnetic thin films containing Co, Ni, Co—Ni as a main component and the Co content of the lowest layer being specified, thus completing the present invention.

The present invention provides (1) a magnetic recording medium comprising a non-magnetic substrate and a magnetic layer formed thereon by oblique deposition, said magnetic layer being composed of at least two ferromagnetic metal thin films, said ferromagnetic metal thin films containing Co and Ni as a main component, in which the Co content of the ferromagnetic metal thin film of the lowest layer is less than 70 atomic per cent; (2) the magnetic recording medium described in (1), in which the Co content of the ferromagnetic metal thin film of the uppermost layer is 75 atomic per cent or more; and (3) the magnetic recording medium described in (1) or (2), in which the lowest layer is higher than the uppermost layer in an average value ($\theta$) of angles between growing directions of columnar crystalline particles constituting the ferromagnetic thin film of the magnetic layer and a principal plane of a substrate.

DESCRIPTION OF THE PREFERRED EMBODIMENTS

In this invention, the magnetic recording medium comprises the magnetic layer composed of at least two ferromagnetic metal thin films formed by oblique deposition, and the ferromagnetic metal thin films contain Co and Ni as a main component.

The ferromagnetic metal thin film containing Co and Ni as a main component is excellent in electromagnetic characteristics (magnetic characteristics) and properties (durability and heat resistance) as a recording medium.

In the present invention, of the plural ferromagnetic thin films, the ferromagnetic thin film of the lowest layer has a Co content of less than 70 atomic per cent, and preferably 0 to 50 atomic per cent. It is preferred that the ferromagnetic thin film of the lowest layer has a Co/Ni ratio of 0/10 to 5/5 in composition. If the Co content is 70 atomic per cent or more, the still durability is unfavorably deteriorated.

Further, in the present invention, the Co content of the ferromagnetic thin film of the uppermost layer is preferably 75 atomic per cent or more, and more preferably 90 to 100 atomic per cent. It is preferred that the ferromagnetic thin film of the uppermost layer has a Co/Ni ratio of 9/1 to 10/0 in composition.

When the Co content is 75 atomic per cent or more, the coercive force is increased. In particular, the electromagnetic characteristics at a short wavelength are excellent, resulting in an extremely preferable ferromagnetic thin film.

Further, in the present invention, the lowest layer is higher than the uppermost layer in the average value ($\theta$) of the angles between the growing directions of the columnar crystalline particles constituting the ferromagnetic thin film of the magnetic layer and a principal plane of a substrate, thereby improving the electromagnetic characteristics and the still durability.

The thickness of the ferromagnetic thin film is 300 to 1500 Å for the lowest layer, and 400 to 1500 Å for the uppermost layer.

As the non-magnetic substrates, various usual films are used, as long as they resist heat on vapor deposition of the ferromagnetic metal thin films. Examples of such films include films of polyesters, polyamides, aramides, polysulfones and polyether ether ketone (PEEK). Films of polyethylene terephthalate (PET) and polyethylene naphthalate (PEN) are available.

The magnetic layer composed of the plural ferromagnetic metal thin films in the present invention is formed, for example, by transferring the non-magnetic substrate film in contact with the periphery of a rotating cylindrical cooling roll, first depositing a ferromagnetic metal of a desired composition composed of an alloy containing Co—Ni as a main component over the substrate film under an atmosphere of oxygen by oblique deposition to form a ferromagnetic thin film, winding the substrate film on a roll, and similarly depositing a ferromagnetic metal containing Co as a main component over the ferromagnetic thin film formed on the substrate film under an atmosphere of oxygen by oblique deposition. The Co content is adjusted to a desired value for each of the ferromagnetic thin films of the lowest and uppermost layer.

The Co content can be adjusted by the composition of the raw material for deposition.

The formation of the ferromagnetic metal thin film by deposition can be conducted under an atmosphere of oxygen.

In the magnetic recording medium of the present invention, the magnetic layer composed of at least two ferromagnetic metal thin films containing Co and Ni as a main component is formed on the non-magnetic substrate by oblique deposition, and the Co content of the ferromagnetic thin film of the lowest layer is less than 70 atomic per cent, whereby the magnetic recording medium can be obtained which is excellent in still characteristics, durability and corrosion resistance, as well as electromagnetic characteristics over the range of a low density to a high density.

The present invention is described below with reference to the following examples.

The characteristics of the magnetic recording tapes were measured as follows:

(1) Rust Generation

After storage under the circumstances of 60° C. and 90% RH for 1 week, the degree of a color change on the magnetic layer side of each tape was visually determined. A criterion for evaluation was as follows:

⊚: No change

○: Change to light yellow

Δ: Change to yellow x: Change to blue (2) Cupping

After storage under the circumstances of 60° C. and 90% RH for 1 week, each tape was placed on a flat surface, and the height (h) of warping of edge portions in the width direction of the tape was measured. A criterion for evaluation was as follows:

⊚: h=0

○: 0<h≦0.2 mm

Δ: 0.2 mm<h<0.5 mm x: h≧0.5 mm (3) Electromagnetic Characteristics

Using a Hi8-standard VTR (SONY EV-S900), the RF output of each tape on which a single signal of 0.75 MHz was recorded was compared with the output of a reference tape to judge the results based on the following criterion for evaluation:

⊚: RF output≧2.0 dB

○: 0 dB≦RF output≦2.0 dB

Δ: −1.0 dB≦RF output<0 dB x: RF output<−1.0 dB (4) Still Durability

Using a Hi8-standard VTR (SONY EV-S900), the time required until its output was reduced to 6 dB at 0° C. was measured.

⊚: Still≧60 minutes

○: 30 minutes≦Still≦60 minutes

Δ: 10 minutes≦Still<30 minutes x: Still<10 minutes (5) Method for Measuring θ

The average value (θ) of the angles between the growing directions of the columnar crystalline particles and the principal plane of the substrate is measured in the following manner:

First, a magnetic recording medium is cut at a plane including the growing directions of the columnar crystalline particles (usually, a plane perpendicular to the principal plane of the medium and including a running direction of a magnetic head). On this cross section, cross sections of the columnar crystalline particles constituting each ferromagnetic metal thin film appear in arc form. Angles between side faces of the columnar crystalline particles appearing on this cross section (boundary lines between adjacent columnar crystalline particles) and the principal plane of the substrate are measured for at least 100 columnar crystalline particles for every ferromagnetic metal thin film to determine an average value thereof for every ferromagnetic metal thin film. Taking these respective average values as the angles between the growing directions of the columnar crystalline particles and the principal plane of the substrate, the average value thereof is further determined as θ. θ is measured at an intermediate point in the thickness direction of the ferromagnetic metal thin film.

EXAMPLES 1 TO 7 AND COMPARATIVE EXAMPLE 1

A 6 μm-thick polyethylene terephthalate (PET) film was drawn out of a feed roll in an atmosphere of argon at $10^{-4}$ Torr, and transferred in contact with the periphery of a rotating cylindrical cooling roll. Then, a ferromagnetic metal was deposited over the film under an atmosphere of oxygen by oblique deposition to form a ferromagnetic thin film, and the film was wound on a take-up roll. Subsequently, the film was rewound from the take-up roll to another roll, from which the film was fed. A ferromagnetic metal was deposited over the film again under an atmosphere of oxygen by oblique deposition to form a ferromagnetic thin film, thereby obtaining a magnetic recording medium having a magnetic layer of two-layer structure.

The kinds of the ferromagnetic metals used for formation of the uppermost and lowest layers, the amount of oxygen, the film thickness and θ were changed to obtain samples shown in Table 1.

TABLE 1

| | Upper Layer | | | Intermediate Layer | | | Lower Layer | | |
|---|---|---|---|---|---|---|---|---|---|
| | Composition Co/Ni | Oxygen Amount (at %) | Film Thickness (Å) | Composition Co/Ni | Oxygen Amount (at %) | Film Thickness (Å) | Composition Co/Ni | Oxygen Amount (at %) | Film Thickness (Å) |
| Example | | | | | | | | | |
| 1 | 9/1 | 12 | 1000 | | | | 6/4 | 15 | 1000 |
| 2 | 9/1 | 12 | 1000 | | | | 3/7 | 15 | 1000 |
| 3 | 9/1 | 12 | 1000 | | | | 0/10 | 15 | 1000 |
| 4 | 10/1 | 12 | 1000 | | | | 6/4 | 15 | 1000 |
| 5 | 8/2 | 12 | 1000 | | | | 6/4 | 15 | 1000 |
| 6 | 9/1 | 12 | 700 | 9/1 | 12 | 700 | 6/4 | 15 | 700 |
| 7 | 9/1 | 12 | 700 | 9/1 | 12 | 700 | 0/10 | 15 | 700 |
| 8 | 9/1 | 12 | 1000 | | | | 65/35 | 15 | 1000 |
| 9 | 75/25 | 12 | 1000 | | | | 6/4 | 15 | 1000 |
| 10 | 75/25 | 12 | 1000 | | | | 65/35 | 15 | 1000 |
| 11 | 10/0 | 12 | 1000 | | | | 65/35 | 15 | 1000 |
| Comparative Example | | | | | | | | | |
| 1 | 9/1 | 12 | 1000 | | | | 8/2 | 15 | 1000 |
| 2 | 9/1 | 12 | 1000 | | | | 7/3 | 15 | 1000 |
| 3 | 7/3 | 12 | 1000 | | | | 65/35 | 15 | 1000 |
| 4 | 7/3 | 12 | 1000 | | | | 6/4 | 15 | 1000 |
| 5 | 10/0 | 12 | 1000 | | | | 7/3 | 15 | 1000 |

| | Upper Layer | | | Intermediate Layer | | | Lower Layer | | | Electromagnetic Characteristics | |
|---|---|---|---|---|---|---|---|---|---|---|---|
| | Hc (Oe) | Ms (emu/cc) | θ (deg) | Hc (Oe) | Ms (emu/cc) | θ (deg) | Hc (Oe) | Ms (emu/cc) | θ (deg) | 0.75 MHz | 7 MHz |
| Example | | | | | | | | | | | |
| 1 | 1400 | 440 | 40 | | | | 500 | 300 | 60 | ◉ | ◉ |
| 2 | 1400 | 440 | 40 | | | | 300 | 250 | 60 | ○ | ◉ |
| 3 | 1400 | 440 | 40 | | | | 200 | 200 | 60 | ○ | ○ |
| 4 | 1600 | 460 | 40 | | | | 500 | 300 | 60 | ◉ | ◉ |
| 5 | 1200 | 400 | 40 | | | | 500 | 300 | 60 | ○ | ○ |
| 6 | 1450 | 430 | 40 | 1450 | 430 | 40 | 500 | 280 | 60 | ◉ | ◉ |
| 7 | 1450 | 430 | 40 | 1450 | 430 | 40 | 200 | 170 | 60 | ○ | ◉ |
| 8 | 1400 | 440 | 40 | | | | 700 | 310 | 60 | ○ | ○ |
| 9 | 1000 | 370 | 40 | | | | 500 | 300 | 60 | ○ | ○ |
| 10 | 1000 | 370 | 40 | | | | 700 | 320 | 60 | ○ | ○ |
| 11 | 1600 | 460 | 40 | | | | 700 | 320 | 60 | ○ | ◉ |
| Comparative Example | | | | | | | | | | | |
| 1 | 1400 | 440 | 40 | | | | 1000 | 380 | 60 | Δ | ◉ |
| 2 | 1400 | 440 | 40 | | | | 800 | 350 | 60 | ○ | ◉ |
| 3 | 800 | 350 | 40 | | | | 700 | 310 | 60 | ○ | × |
| 4 | 800 | 350 | 40 | | | | 500 | 300 | 60 | ○ | × |
| 5 | 1600 | 460 | 40 | | | | 800 | 350 | 60 | ○ | ◉ |

| Example | Rust Generation | Cupping | Still |
|---|---|---|---|
| 1 | ◉ | ◉ | ◉ |
| 2 | ◉ | ◉ | ◉ |
| 3 | ◉ | ◉ | ◉ |
| 4 | ○ | ○ | ○ |
| 5 | ◉ | ◉ | ◉ |
| 6 | ◉ | ◉ | ◉ |
| 7 | ◉ | ◉ | ◉ |
| 8 | ◉ | ◉ | ○ |
| 9 | ◉ | ◉ | ◉ |
| 10 | ◉ | ◉ | ◉ |
| 11 | ○ | ○ | ○ |
| Comparative Example | | | |
| 1 | Δ | Δ | × |
| 2 | Δ | Δ | Δ |
| 3 | ◉ | ◉ | ◉ |
| 4 | ◉ | ◉ | ◉ |
| 5 | Δ | Δ | × |

The magnetic recording medium of the present invention is excellent in electromagnetic characteristics over the range of a low density to a high density, and particularly a reduction in reproduced output at a high density is minimized. In addition, both the still characteristics and the durability are extremely excellent. The magnetic recording medium of the present invention is therefore very suitable as a medium for high density recording.

What is claimed is:

1. A magnetic recording medium comprising a non-magnetic substrate having a major surface and a principal plane parallel to said surface, and a magnetic layer formed on said surface by oblique deposition, said magnetic layer being composed of at least two ferromagnetic metal thin film layers, a lowest film layer disposed closest to the substrate and an uppermost film layer disposed farthest from the substrate, said ferromagnetic metal thin film layers containing Co and Ni as main components, in which the Co content of the lowest ferromagnetic thin film layer is less than 70 atomic per cent, the Co content of the uppermost ferromagnetic thin fill layer is 75 atomic per cent or more, and the lowest film layer has a higher value of $\theta$ than the uppermost film layer, $\theta$ being an average value of a plurality of angles, each of said angles being the angle between a line oriented along the growing direction of the columnar crystalline particles constituting the ferromagnetic thin film of the magnetic layer and the principal plane of the substrate.

2. The magnetic recording medium according to claim 1, in which the Co content of the lowest ferromagnetic thin film layer is less than 50 atomic per cent.

3. The magnetic recording medium according to claim 1, in which the Co content of the lowest ferromagnetic thin film layer has a Co-to-Ni ratio of 5-to-5 or smaller.

4. The magnetic recording medium according to claim 1, in which the Co content of the uppermost ferromagnetic thin film layer is within the range of 90 to 100 atomic per cent.

5. The magnetic recording medium according to claim 1, in which the Co content of the uppermost ferromagnetic thin film layer has a Co-to-Ni ratio of 9-to-1 or greater.

* * * * *